United States Patent
Kamijima

(10) Patent No.: US 6,731,459 B2
(45) Date of Patent: May 4, 2004

(54) THIN FILM MAGNETIC HEAD

(75) Inventor: Akifumi Kamijima, Chuo-ku (JP)

(73) Assignee: TDK Corporation, Tokyo (JP)

( * ) Notice: Subject to any disclaimer, the term of this patent is extended or adjusted under 35 U.S.C. 154(b) by 308 days.

(21) Appl. No.: 09/845,357

(22) Filed: May 1, 2001

(65) Prior Publication Data

US 2001/0040764 A1 Nov. 15, 2001

(30) Foreign Application Priority Data

May 11, 2000 (JP) ........................................ 2000-138434

(51) Int. Cl.[7] .................................................. G11B 5/31
(52) U.S. Cl. ..................................................... 360/126
(58) Field of Search ................................. 360/126, 123, 360/317, 119–120

(56) References Cited

U.S. PATENT DOCUMENTS

| 4,416,056 | A | * | 11/1983 | Takahashi | ................ | 29/603.24 |
| 5,113,300 | A | * | 5/1992 | Ikeda et al. | ................ | 360/126 |
| 6,204,997 | B1 | * | 3/2001 | Sasaki | ................ | 360/123 |
| 6,304,414 | B1 | * | 10/2001 | Crue et al. | ................ | 360/126 |
| 6,396,660 | B1 | * | 5/2002 | Jensen et al. | ................ | 360/126 |
| 6,466,401 | B1 | * | 10/2002 | Hong et al. | ................ | 360/123 |

FOREIGN PATENT DOCUMENTS

| JP | A-5-6514 | 1/1993 |
| JP | A-8-339508 | 12/1996 |

* cited by examiner

Primary Examiner—Brian E. Miller
(74) Attorney, Agent, or Firm—Oliff & Berridge, PLC

(57) ABSTRACT

There is provided a thin film magnetic head which can improve electromagnetic conversion characteristics and a method of manufacturing the same. A recording gap layer is formed on a lower magnetic pole layer. A stepped portion of a nonmagnetic material having an almost vertically formed end face at a side facing an ABS surface is formed on the recording gap layer. A space portion is formed at the end face. An upper magnetic pole layer magnetically connected to the lower magnetic pole layer to constitute a closed magnetic path is formed on the recording gap layer, the space portion, and the stepped portion. A thin film coil is formed between the upper and lower magnetic pole layers through an insulating layer. A side of the upper magnetic pole layer facing the space portion includes an inclined surface connecting the surface of the recording gap layer and the stepped portion.

4 Claims, 10 Drawing Sheets

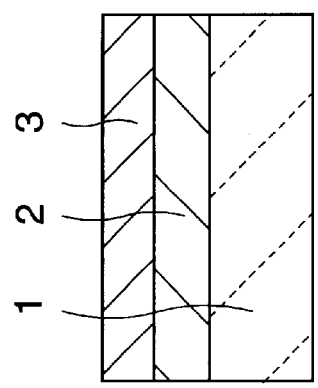
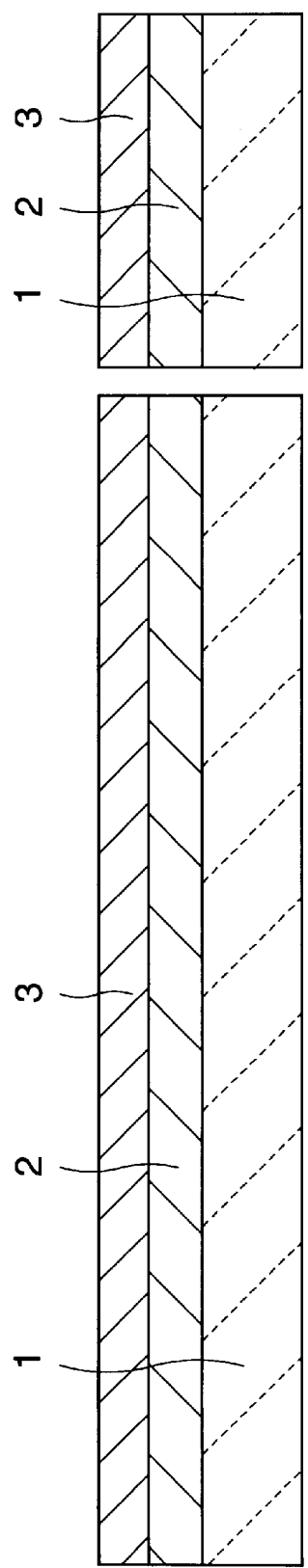

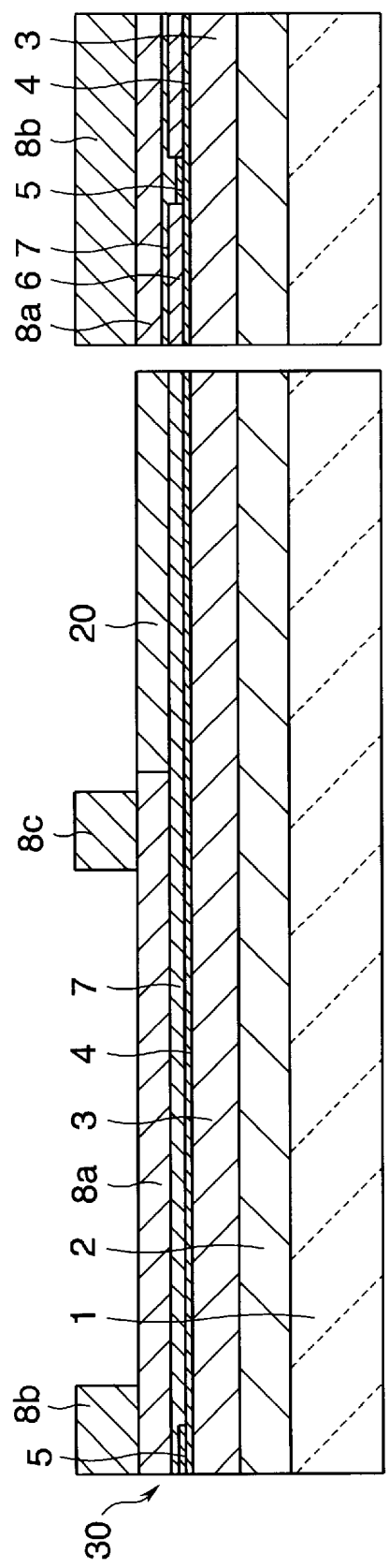

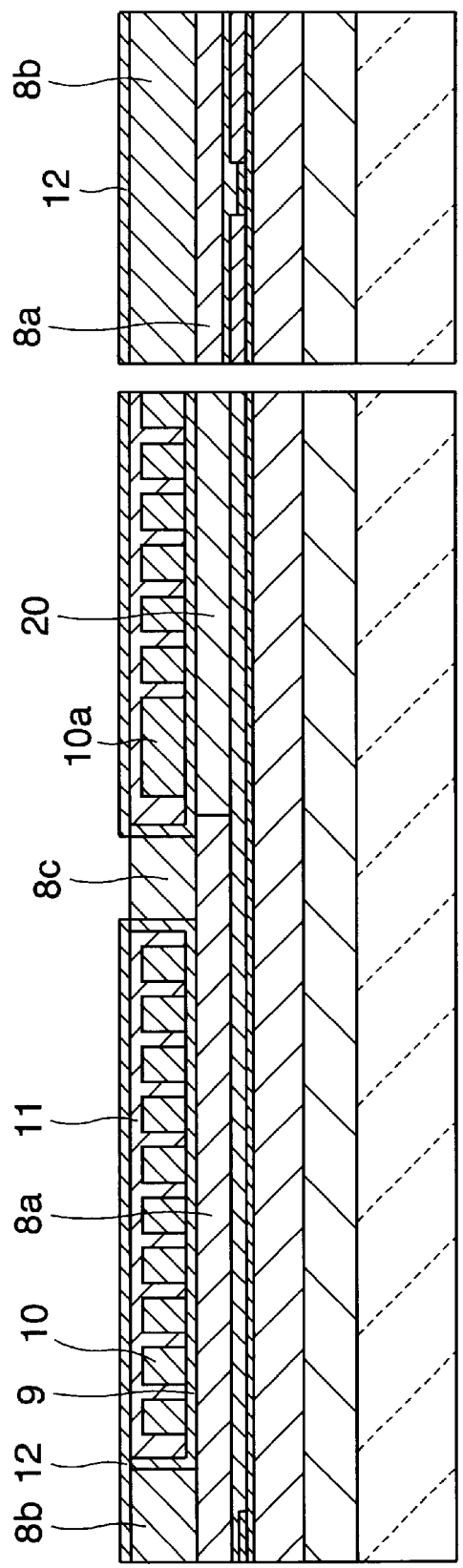

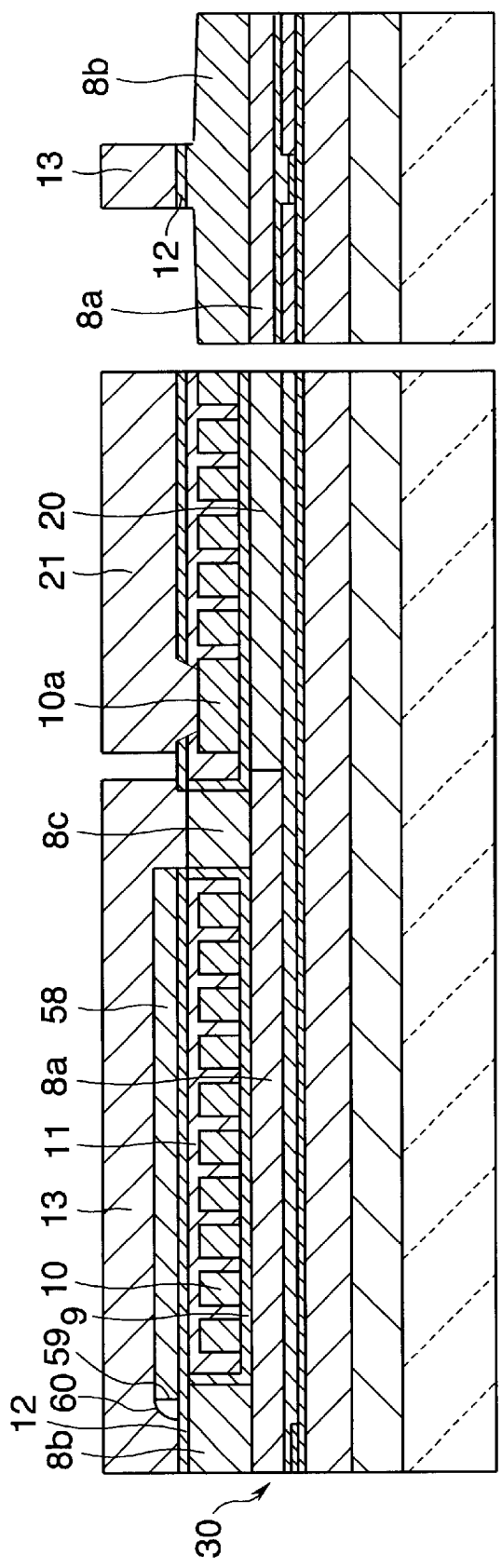

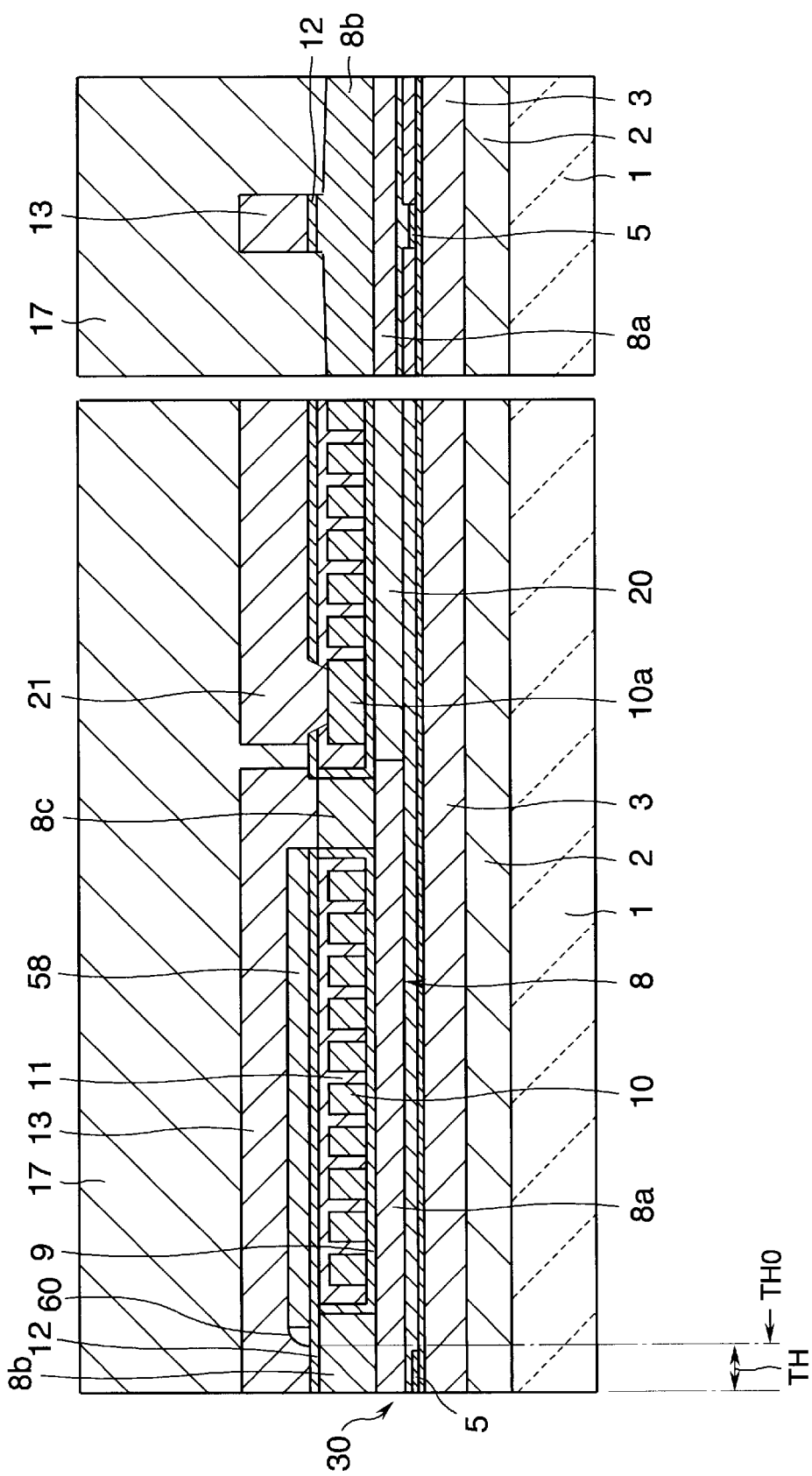

THIN FILM MAGNETIC HEAD

BACKGROUND OF THE INVENTION

1. Field of the Invention

The present invention relates to a thin film magnetic head provided with an induction type magnetic recording head and a method of manufacturing the same.

2. Description of the Related Art

A composite type thin film magnetic head including a magnetoresistive (MR) head used for data reproduction and an induction type magnetic head used for data recording is used as a magnetic head of a magnetic disk device.

The MR head includes any one of an AMR (Anisotropic Magnetoresistive) component using an AMR effect, a GMR (Giant Magnetoresistive) component using a GMR effect, and a TMR (Tunneling Magnetoresistive) component using a tunnel junction film indicating a magnetoresistive effect. As the surface recording density of a magnetic recording medium becomes high, a component to be used is changed from the AMR component to the GMR component, and further, to the TMR component.

As one factor for determining the performance of the MR head, there is optimization of an MR height. The MR height is a height of the MR component from an end portion at a side facing an air bearing surface (ABS) opposite to a magnetic recording surface of a magnetic recording medium to an end portion at the opposite side, and this height depends on an amount of polishing of the ABS surface in a head manufacturing process.

The induction type magnetic head realizes a ring structure having a narrow gap by a semiconductor process, and includes upper and lower magnetic pole layers which are laminated through an insulating film and has a gap (write gap) at the side facing the ABS surface to form a closed magnetic path, and a thin film coil formed in the insulating film between upper and lower magnetic poles. The head material is magnetized to have high magnetic flux density by a recording current flowing through the thin film coil, and a predetermined leakage magnetic field is formed over the gap to record data.

As one factor for determining the performance of the induction type magnetic head, there is optimization of a throat height (TH). The throat height is a height of the magnetic pole from the ABS surface to the end portion of the insulating film, and this height also depends on an amount of polishing of the ABS surface in the head manufacturing process. In order to improve the head efficiency of the recording head, it is necessary to make the throat height as short as possible.

In order to raise the recording density, it is necessary to raise the track density of the magnetic recording medium. For that purpose, it is necessary to realize a recording head in which a magnetic pole width and a gap width at the ABS surface are made narrow; therefore a semiconductor processing technique is used.

The foregoing composite type thin film magnetic head is manufactured through a plurality of manufacturing processes, for example, a sputtering process, a photolithography process, a frame plating process, an etching process, a polishing process, and the like. Hereinafter, an example of a method of manufacturing a thin film magnetic head will be described in brief by use of the thin film magnetic head having a so-called step gap structure.

First, an $Al_2O_3TiC$ substrate having high hardness and excellent in wear resistance is used. When the magnetic head is completed, this substrate itself functions as a slider body of the magnetic head. The reason why the substrate having high hardness and excellent in wear resistance is used is to secure the floating accuracy of the head and to obtain an accurate MR height and throat height.

Then, for example, a chromium film excellent in adhesiveness is formed on the $Al_2O_3TiC$ substrate by sputtering or the like. Next, a lower shield layer made of, for example, permalloy is formed. Next, an MR component interposed between insulating films is formed on the lower shield layer.

Next, an upper shield layer made of, for example, permalloy is formed. By this, an MR head for reproduction is completed. The upper shield layer is also used as a lower magnetic pole layer of an induction type magnetic head for recording. Next, a thin film coil made of copper or the like is formed on the lower magnetic pole layer through an insulating film by a frame plating method or the like.

Next, after the thin film coil is embedded in an insulating film and flattening is made, a recording gap layer is formed on an upper layer. A process from the formation of the recording gap layer to the formation of an upper magnetic pole layer will be described in brief with reference to FIGS. 9A to 9F and FIGS. 10A to 10F. In FIGS. 9A to 9F and FIGS. 10A to 10F, FIGS. 9A, 9C and 9E and FIGS. 10A, 10C and 10E show sections vertical to the ABS surface, and show the sections taken along line A—A shown in FIG. 9B. FIGS. 9B, 9D and 9F and FIGS. 10B, 10D and 10F show partial planes near the ABS surface.

First, as shown in FIGS. 9A and 9B, a stepped portion (step gap) 158 of a nonmagnetic material with an almost vertical end face 159 at a side facing the ABS surface (see FIG. 10F) is formed on a recording gap layer 112.

Next, as shown in FIGS. 9C and 9D, after a seed layer 151 for a plating treatment is formed, as shown in FIGS. 9E and 9F, a positive resist 152 is coated on the entire surface and patterning is made to form a resist frame 153 (see FIGS. 10A and 10B).

Next, as shown in FIGS. 10C and 10D, a plating film made of, for example, permalloy is formed by a frame plating method using the formed resist frame 153 as a mold, and then, the resist frame 153 is removed and an upper magnetic pole layer 113 is formed (see FIGS. 10E and 10F).

Although not shown below, etching is carried out using the upper magnetic pole layer 113 at the side facing the ABS surface as a mask, so that the recording gap layer is patterned. The upper magnetic pole layer is formed so as to be magnetically connected to the lower magnetic pole layer through the coil at the opposite side of the recording gap layer so that a closed magnetic path is formed. A protection film is formed on the upper layer of the upper magnetic pole layer, and the film forming process is ended.

Next, the $Al_2O_3TiC$ substrate is cut into rod-like substrates including several tens of heads. The ABS formation surface of the rod-like substrate is polished to provide the throat height of a height of several $\mu$m. After the ABS surface is formed, the rod-like substrate is cut, so that a plurality of thin film magnetic heads are completed.

Like this, in the thin film magnetic head of the step gap structure, for example, as shown in FIGS. 10E and 10F, the stepped portion 158 of the nonmagnetic material in which the end face 159 at the side facing the ABS surface is formed almost vertically, is formed on the recording gap layer 112. By making the step gap structure, the upper magnetic pole layer 113 can be formed on the flattest possible surface.

Besides, according to the step gap structure, the throat height is defined as a height from the ABS surface to the end face 159 of the stepped portion 158. Here, the position of the end face 159 of the stepped portion 158 becomes a throat height zero (TH0) position. Thus, an interval between the not-shown lower magnetic pole layer and the upper magnetic pole layer 113 is a constant interval equal to the thickness of the recording gap layer 112 from the ABS surface to the throat height zero position, and abruptly becomes large from the throat height zero position (that is, the position of the end face 159) at the opposite side to the ABS surface.

However, like this, in the structure where the interval between the lower magnetic pole layer and the upper magnetic pole layer is abruptly changed in the vicinity of the throat height zero position, the flow of a magnetic flux passing through the magnetic pole layer and directed toward the recording gap layer is abruptly changed in the vicinity of the throat height zero position. Thus, there occurs a problem that the magnetic flux is saturated in the vicinity of the throat height zero position, and the electromagnetic conversion characteristics of the thin film magnetic head are deteriorated. The electromagnetic conversion characteristics are specifically overwrite characteristics in the case where data is overwritten in a region in which data is already written on a recording medium, non-linear transition shift (NLTS), and the like.

SUMMARY OF THE INVENTION

An object of the present invention is to provide a thin film magnetic head which can improve electromagnetic conversion characteristics, and a method of manufacturing the same.

The above object is achieved by a thin film magnetic head comprising a lower magnetic pole layer having one magnetic pole at a side facing an ABS surface, a gap layer formed on at least the one magnetic pole, a stepped portion of a nonmagnetic material formed on the gap layer and having an almost vertically formed end face at a side facing the ABS surface, a space portion formed at the end face, an upper magnetic pole layer including an other magnetic pole opposite to the one magnetic pole through the gap layer, formed on at least the gap layer, the space portion, and the stepped portion, and magnetically connected to the lower magnetic pole layer to constitute a closed magnetic path, and a thin film coil provided between the upper and lower magnetic pole layers through an insulating layer.

In the thin film magnetic head of the present invention, a throat height is defined by an end portion of the space portion at a side facing the ABS surface. Besides, the end portion of the space portion at the side facing the ABS surface is positioned closer to the ABS surface than an end portion of the other magnetic pole at an opposite side to the ABS surface. Besides, in the thin film magnetic head of the present invention, a side of the upper magnetic pole layer facing the space portion includes an inclined surface connecting a surface of the gap layer and the stepped portion.

Besides, the above object is achieved by a method of manufacturing a thin film magnetic head, the method comprising a step of forming a lower magnetic pole layer having one magnetic pole at a side facing an ABS surface on a substrate, a step of forming a gap layer on the lower magnetic pole layer, a step of forming, on the gap layer, a stepped portion of a nonmagnetic material having an almost vertical end face at a side facing the ABS surface, a step of forming a seed layer for a plating treatment, a step of carrying out patterning by coating a positive resist on an entire surface and exposing the resist by such an exposing amount as to leave the resist at the end face, a step of forming an upper magnetic pole layer including an other magnetic pole opposite to the one magnetic pole through the gap layer and magnetically connected to the lower magnetic pole layer to constitute a closed magnetic path, by a plating treatment using a resist pattern as a mask in which the resist is left at the end face, a step of forming a space portion with the upper magnetic pole layer, the gap layer, and the end face by removing the resist pattern and the seed layer of its under layer, and a step of forming a thin film coil between the upper and lower magnetic pole layers through an insulating layer.

BRIEF DESCRIPTION OF THE DRAWINGS

FIGS. 1A and 1B are process sectional views for explaining a method of manufacturing a thin film magnetic head according to an embodiment of the present invention;

FIGS. 2A and 2B are process sectional views for explaining the method of manufacturing the thin film magnetic head according to the embodiment of the present invention;

FIGS. 4A and 4B are process sectional views for explaining the method of manufacturing the thin film magnetic head according to the embodiment of the present invention;

FIGS. 5A and 5B are process sectional views for explaining the method of manufacturing the thin film magnetic head according to the embodiment of the present invention;

FIGS. 6A and 6B are process sectional views for explaining the method of manufacturing the thin film magnetic head according to the embodiment of the present invention, and are the views showing the thin film magnetic head;

DETAILED DESCRIPTION OF THE PREFERRED EMBODIMENTS

Figures 3A, 3B:
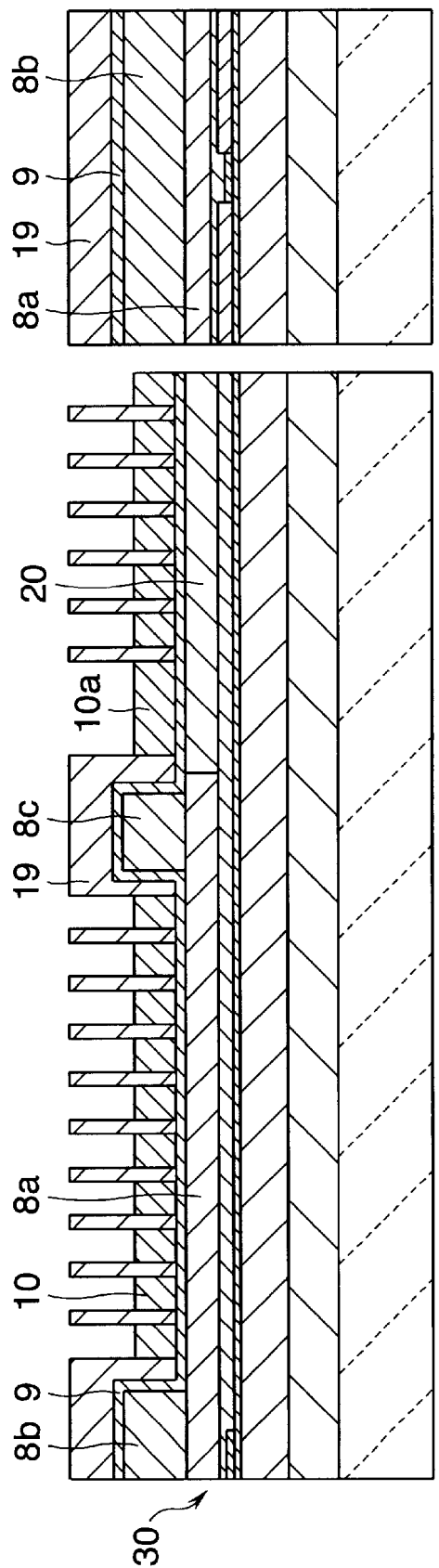
FIGS. 3A and 3B are process sectional views for explaining the method of manufacturing the thin film magnetic head according to the embodiment of the present invention.

A thin film magnetic head according to an embodiment of the present invention and a method of manufacturing the same will be described with reference to FIGS. 1A to 8F. First, the thin film magnetic head according to this embodiment of the present invention and the method of manufacturing the same will be described with reference to FIGS. 1A to 6B. Incidentally, in FIGS. 1A to 6B, FIGS. 1A, 2A, 3A, 4A, 5A and 6A show sections vertical to an ABS surface, and FIGS. 1B, 2B, 3B, 4B, 5B and 6B show sections of a magnetic pole portion parallel to the ABS surface.

In the method of manufacturing the thin film magnetic head according to this embodiment, first, as shown in FIGS. 1A and 1B, an insulating layer 2 made of, for example, alumina ($Al_2O_3$) is deposited to a thickness of about 5 $\mu$m on a substrate 1 made of, for example, $Al_2O_3TiC$. Next, a lower shield layer 3 for a reproducing head, made of, for example, permalloy is formed to a thickness of about 3 μm on the insulating layer 2. The lower shield layer 3 is selectively formed on the insulating layer 2 by, for example, a plating method using a photoresist film as a mask. Next, an insulating layer (not shown) made of, for example, alumina is formed to a thickness of, for example, 4 to 5 μm on the entire surface of the substrate, and a flattening treatment of a surface is carried out by polishing the insulating layer through, for example, a CMP (Chemical Mechanical Polishing method) until the lower shield layer 3 is exposed.

Next, as shown in FIGS. 2A and 2B, a lower shield gap film 4 as an insulating film is formed to a thickness of, for example, about 20 to 40 μm on the lower shield layer 3. Next, an MR component 5 for reproduction is formed to a thickness of several tens nm on the lower shield gap film 4. The MR component 5 is formed by selectively etching an MR film formed by, for example, a sputtering method.

Next, a pair of electrode layers 6 electrically connected to the MR component 5 are formed to a thickness of several tens nm on the lower shield gap film 4. Next, as an upper shield gap film 7, for example, an insulating film having a thickness of, for example, about 20 to 40 nm is formed on the lower shield gap film 4 and the MR component 5, and the MR component 5 is embedded in the shield gap films 4 and 7. As an insulating material used for the shield gap films 4 and 7, there is alumina, aluminum nitride, diamond-like carbon (DLC), or the like. The shield gap films 4 and 7 may be formed by a sputtering method or a chemical vapor deposition (CVD) method. In the case where the shield gap films 4 and 7 made of alumina films are formed by the CVD method, for example, trimethylaluminium $(Al(CH_3)_3)$ and $H_2O$ are used as materials. When the CVD method is used, it is possible to form the shield gap films 4 and 7 which are thin, are dense, and have few pin holes.

Next, a first portion 8a of an upper shield layer and concurrently lower magnetic pole layer (hereinafter referred to as a lower magnetic pole layer) 8 made of a magnetic material having a thickness of about 1.0 to 1.5 μm and used for both a reproducing head and a recording head is selectively formed on the upper shield gap film 7. Incidentally, the lower magnetic pole layer 8 is constituted by the first portion 8a, and a second portion 8b and a third portion 8c described later. The first portion 8a of the lower magnetic pole layer 8 is arranged at a position opposite to at least a part of a thin film coil described later.

Next, the second portion 8b and the third portion 8c of the lower magnetic pole layer 8 are formed to a thickness of about 1.5 to 2.5 μm on the first portion 8a of the lower magnetic pole layer 8. The second portion 8b forms a magnetic pole portion of the lower magnetic pole layer 8 and is connected to the surface of the first portion 8a at a side (upper side in the drawing) where the thin film coil is formed. The third portion 8c is a portion for connecting the first portion 8a and an upper magnetic pole layer described later.

The first portion 8a, the second portion 8b, and the third portion 8c of the lower magnetic pole layer 8 may be formed by a plating method using NiFe (Ni: 80 wt. %, Fe: 20 wt. %), NiFe (Ni: 45 wt. %, Fe: 55 wt. %) as a high saturation magnetic flux density material, or the like, or may be formed by a sputtering method using a material such as FeN or FeZrN of a high saturation magnetic flux density material. In addition to these, CoFe, Co amorphous material, or the like of a high saturation magnetic flux density material may be used.

Next, as shown in FIGS. 3A and 3B, an insulating film 9 made of, for example, alumina is formed to a thickness of about 0.3 to 0.6 μm on the whole portion.

Next, a photoresist is patterned by a photolithography process to form a resist frame 19 for forming a thin film coil by a frame plating method. Next, a thin film coil 10 made of, for example, copper (Cu) is formed to have, for example, a thickness of about 1.0 to 2.0 μm and a coil pitch of 1.2 to 2.0 μm by the frame plating method using the resist frame 19. Next, the resist frame 19 is removed. Incidentally, a connection portion 10a is used for connecting the thin film coil 10 to a conductive layer (lead) described later.

Next, as shown in FIGS. 4A and 4B, an insulating layer 11 made of, for example, alumina is formed to a thickness of about 3 to 4 μm on the whole portion. Next, a flattening treatment of a surface is carried out by polishing the insulating layer 11 by, for example, the CMP until the second portion 8b and the third portion 8c of the lower magnetic pole layer 8 are exposed. Here, although the thin film coil 10 is not exposed in FIGS. 4A and 4B, the thin film coil 10 may be exposed.

Next, a recording gap layer 12 made of an insulating material is formed to a thickness of, for example, 0.2 to 0.3 μm on the exposed second portion 8b and third portion 8c of the lower magnetic pole layer 8 and the insulating layer 11. As an insulating material used for the recording gap layer 12, in general, there is alumina, aluminum nitride, silicon oxide material, silicon nitride material, diamond-like carbon (DLC), or the like. The recording gap layer 12 may be formed by a sputtering method, or may be formed by a CVD method. In the case where the recording gap layer 12 made of an alumina film is formed by the CVD method, for example, trimethylaluminium $(Al(CH_3)_3)$ and $H_2O$ are used as materials. When the CVD method is used, it is possible to form the recording gap layer 12 which is thin, is dense, and has few pin holes.

Next, for the purpose of forming a closed magnetic path, at a portion on the third portion 8c of the lower magnetic pole layer 8, the recording gap layer 12 is partially etched to form a contact hole. Besides, at a portion on the connection portion 10a of the thin film coil 10, the recording gap layer 12 and the insulating layer 11 are partially etched to form a contact hole.

Next, as shown in FIGS. 5A and 5B, a stepped portion 58 having an almost vertically standing end face 59 at a side facing an ABS surface 30 and made of a nonmagnetic material of a thickness of about 0.5 μm is formed on the recording gap 12. In this embodiment, the stepped portion 58 is formed from the end face 59 at a predetermined distance from the ABS surface 30 to a portion immediately before the third portion 8c.

Next, a space portion 60 adjacent to the end face 59 is formed on the recording gap layer 12. The formation of the space portion 60 will be described later with reference to the drawings.

Next, an upper magnetic pole layer 13 is formed to a thickness of about 2.0 to 3.0 μm over a portion from the ABS surface 30 to the third portion 8c of the lower magnetic pole layer 8, and a conductive layer 21 is formed to a thickness of about 2.0 to 3.0 μm so as to be connected to the connection portion 10a of the thin film coil 10. The upper magnetic pole layer 13 is connected to the third portion 8c of the lower magnetic pole layer 8 through the contact hole formed on the third portion 8c of the lower magnetic pole layer 8 and is magnetically connected.

As described above, in the space portion 60, a space is formed at a predetermined position separate from the ABS surface 30 with the upper magnetic pole layer 13, the recording gap layer 12, and the end face 59 of the stepped portion 58. The throat height is defined by the end portion of the space portion 60 at the side facing the ABS surface 30. Thus, the end portion of the space portion 60 at the side facing the ABS surface 30 is formed at a position closer to the ABS surface 30 than the end portion of the second portion 8b of the lower magnetic pole layer 8 at the opposite side to the ABS surface 30. A side of the upper magnetic pole layer 13 facing the space portion 60 includes an inclined surface connecting the surface of the recording gap layer 12 and the stepped portion 58. This inclined surface is formed into a linear shape or a curved shape, and is desirably formed into such a shape as to form a part of a cylindrical surface with an axis parallel to the ABS surface 30 and parallel to the recording gap layer 12 as the center.

The upper magnetic pole layer 13 may be formed by a plating method using NiFe (Ni: 80 wt. %, Fe: 20 wt. %), NiFe (Ni: 45 wt. %, Fe: 55 wt. %) as a high saturation magnetic flux density material, or the like, or may be formed by a sputtering method using a material such as FeN or FeZrN of a high saturation magnetic flux density material. In addition to these, CoFe, Co amorphous material, or the like of a high saturation magnetic flux density material may be used. Besides, for the purpose of improving high frequency characteristics, the upper magnetic pole layer 13 maybe formed to have such a structure that inorganic insulating films and magnetic layers of permalloy or the like are overlapped to form several laminate layers.

Next, the recording gap layer 12 is selectively etched by a dry etching using the upper magnetic pole layer 13 as a mask. As the dry etching at this time, for example, a reactive ion etching (RIE) using a chlorine gas such as $BCl_2$ or $Cl_2$ or a fluorine gas such as $CF_4$ or $SF_6$ is used. Next, for example, by argon ion milling, the second portion 8b of the lower magnetic pole layer 8 is selectively etched by about 0.3 to 0.6 $\mu$m to form a trim structure as shown in FIG. 5B. According to this trim structure, it is possible to prevent the increase of an effective track width due to the expansion of a magnetic flux generated at the time of writing of a narrow track.

Next, as shown in FIGS. 6A and 6B, an overcoat layer 17 made of, for example, alumina is formed to a thickness of 20 to 40 $\mu$m on the entire surface of the substrate, and then, flattening is carried out, and a not-shown pad for an electrode is formed thereon. Finally, polishing of a slider including the respective layers is carried out to form the ABS surface 30 of the recording head and the reproducing head, and the thin film magnetic head is completed.

Here, the structure of the thin film magnetic head according to this embodiment will be described with reference to FIGS. 6A and 6B. The thin film magnetic head of this embodiment includes the lower magnetic pole layer 8 having one magnetic pole at the side facing the ABS surface 30, and the recording gap layer 12 formed on the one magnetic pole. Further, the magnetic head includes the stepped portion 58 of the nonmagnetic material formed on the recording gap layer 12 and having the almost vertically formed end face 59 at the side facing the ABS surface 30.

The space portion 60 is formed at the end face 59. The upper magnetic pole layer 13 including the other magnetic pole opposite to the one magnetic pole through the recording gap layer 12 and magnetically connected to the lower magnetic pole layer 8 to constitute the closed magnetic path is formed on the recording gap layer 12, the space portion 60, and the stepped portion 58. Besides, the thin film coil 10 is formed between the upper and lower magnetic pole layers 8 and 13 through the insulating layer 11.

In FIGS. 6A and 6B, reference character TH designates a throat height, and TH0 designates a throat height zero position. In this embodiment, the throat height zero position TH0 is defined by the end portion of the space portion 60 at the side facing the ABS surface 30. The end portion of the space portion 60 at the side facing the ABS surface 30 is arranged at the position closer to the ABS surface 30 than the end portion of the second portion 8b of the lower magnetic pole layer 8 at the opposite side to the ABS surface 30. Besides, a side of the upper magnetic pole layer 13 facing the space portion 60 includes an inclined surface connecting the surface of the recording gap layer 12 and the stepped portion 58.

Figure 7A:
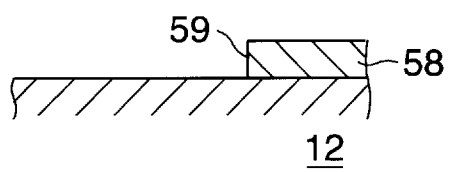
FIGS. 7A to 7F are views for explaining a method of forming a space portion in a method of manufacturing a thin film magnetic head according to an embodiment of the present invention.
Figure 7B:
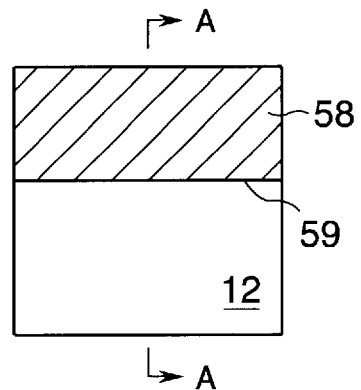

Next, a method of forming the space portion 60 and the upper magnetic pole layer 13 will be described with reference to FIGS. 7A to 7F and FIGS. 8A to 8F. In FIGS. 7A to 7F and FIGS. 8A to 8F, FIGS. 7A, 7C and 7E shows sections vertical to the ABS surface, and shows the sections taken along line A—A of FIG. 7B. FIGS. 7B, 7D and 7F show partial planes near the ABS surface.

First, the stepped portion 58 made of the nonmagnetic material of a thickness of about 0.5 $\mu$m and having the almost vertically standing end face 59 at the side facing the ABS surface (see FIG. 8F) which is formed at the lower side of the plan view shown in FIG. 7B, is formed on the recording gap layer 12.

Figure 7C:
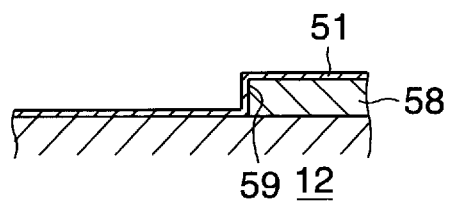
Figure 7D:
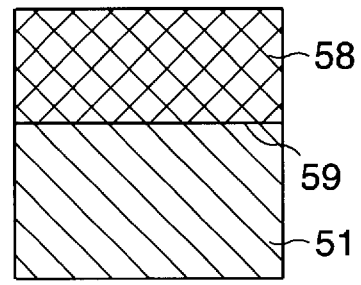

Next, as shown in FIGS. 7C and 7D, the seed layer (electrode film) 51 for plating is formed on the recording gap layer 12 and the stepped portion 58.

Figure 7E:
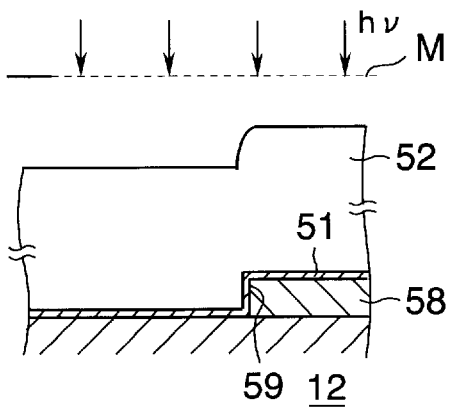
Figure 7F:
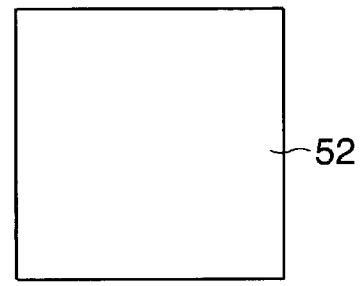

Next, as shown in FIGS. 7E and 7F, the positive resist layer 52 is formed on the seed layer 51. Next, the resist layer 52 is exposed using a photo mask M. The photo mask M has a light shielding pattern corresponding to the shape of the resist frame for forming the upper magnetic pole layer 13 by the frame plating method. At this time, an amount of exposure is adjusted so that the resist layer remains at the end face 59 of the stepped portion 58 and the exposure is carried out.

Figure 8A:
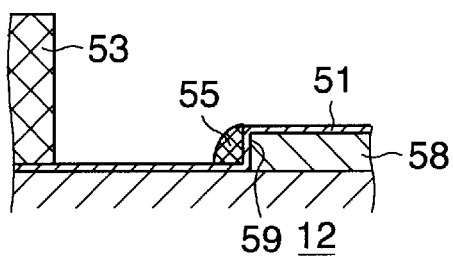
FIGS. 8A to 8F are views for explaining the method of forming the space portion in the method of manufacturing the thin film magnetic head according to the embodiment of the present invention.
Figure 8B:
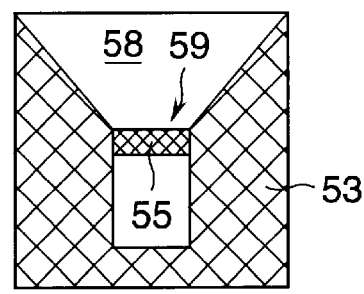

After the resist layer 52 is exposed, development is carried out, and as shown in FIGS. 8A and 8B, the resist frame 53 is formed on the seed layer 51, and at the same time, a resist residual portion 55 is formed at a position corresponding to the space portion on the seed layer 51 of the end face 59 of the stepped portion 58.

The resist residual portion 55 is formed so that the end portion at the side facing the ABS surface is arranged at the throat height zero position TH0.

Figure 8C:
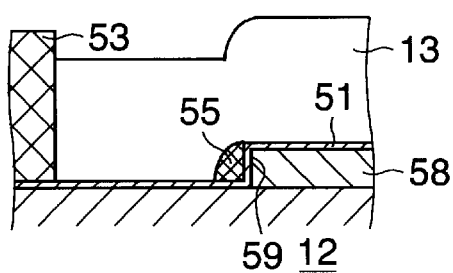
Figure 8D:
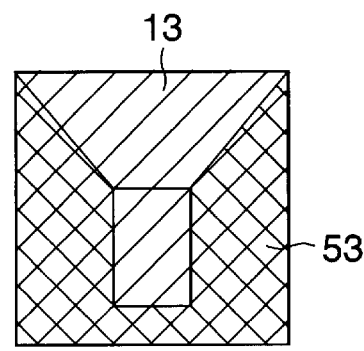

Next, as shown in FIGS. 8C and 8D, the upper magnetic pole layer 13 is formed by the frame plating method using the resist frame 53. Although the seed layer is not formed on the resist residual portion 55, since the thickness of the plating film forming the upper magnetic pole layer 13 is much larger than the height of the resist residual portion 55, the plating layer is formed to overhang the resist residual portion 55. By this, the plating layer is also formed on the resist residual portion 55, and the upper magnetic pole layer 13 continuing before and behind the resist residual portion 55 is obtained.

Figure 8E:
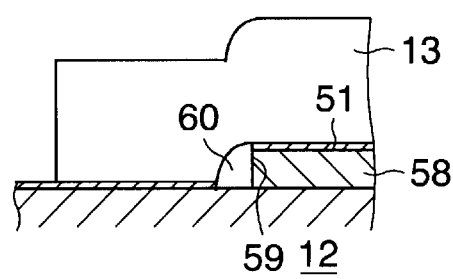
Figure 8F:
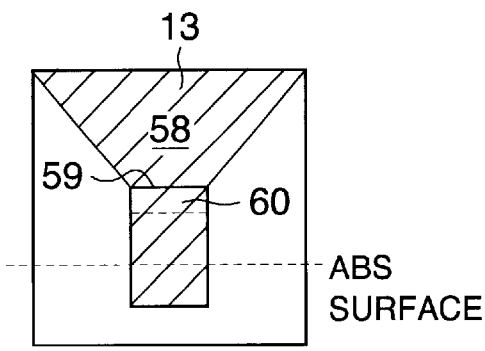
Figure 9A:
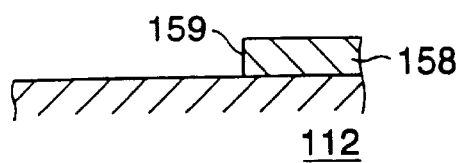
FIGS. 9A to 9F are views for explaining a method of manufacturing a conventional thin film magnetic head of a step gap structure.
Figure 9B:
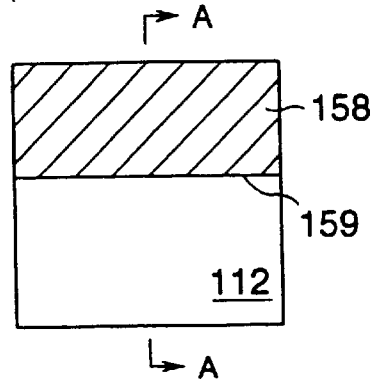
Figure 9C:
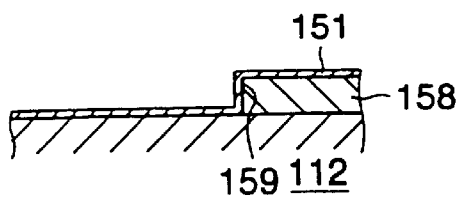
Figure 9D:
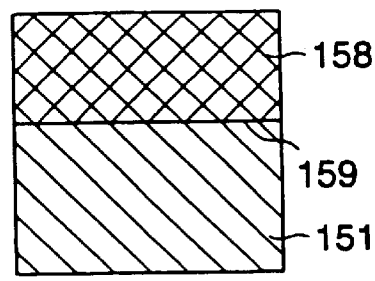
Figure 9E:
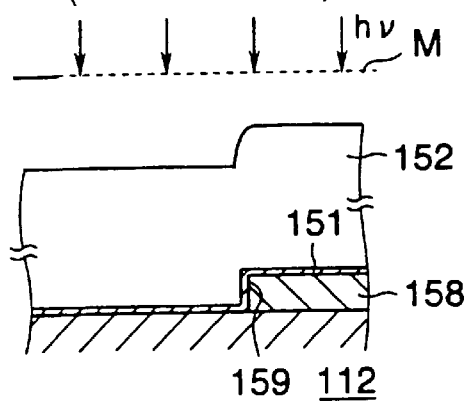
Figure 9F:
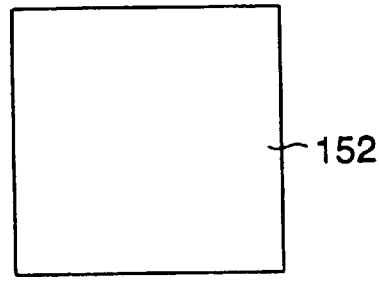
Figure 10A:
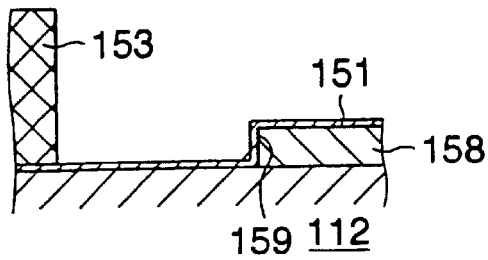
FIGS. 10A to 10F are views for explaining the method of manufacturing the conventional thin film magnetic head of the step gap structure.
Figure 10B:
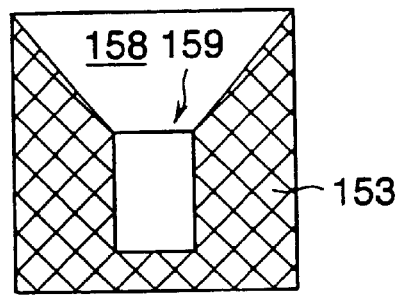
Figure 10C:
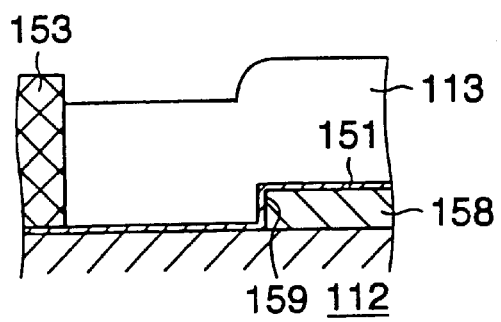
Figure 10D:
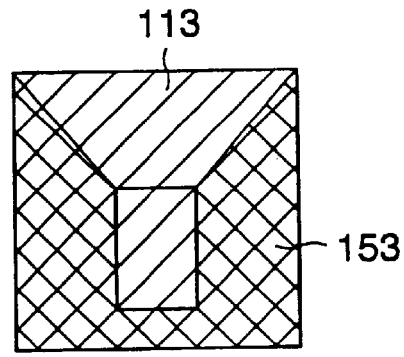
Figure 10E:
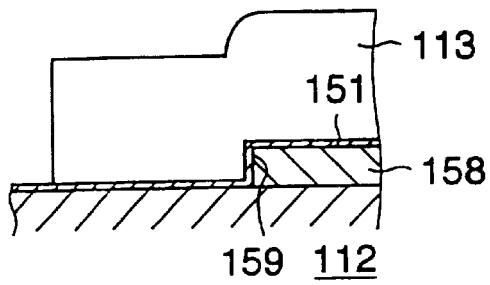
Figure 10F:
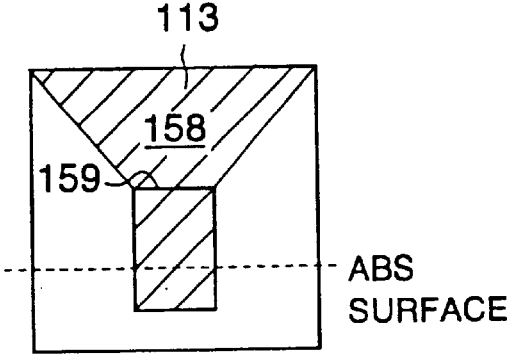

Next, as shown in FIGS. 8E and 8F, the resist frame 53 is removed, and the resist residual portion 55 and the seed layer 51 existing under these are removed to form the space portion 60. In the case where the seed layer 51 is removed by a wet etching, the seed layer 51 can be removed without leaving the seed layer 51 under the space portion 60. In the case where the seed layer 51 is removed by a dry etching, although there is a case where the seed layer 51 partially remains under the space portion 60, this hardly influences the electromagnetic conversion characteristics.

Like this, according to this embodiment, the space portion 60 is formed between the upper magnetic pole layer 13 and the recording gap layer 12, and the throat height is defined by the end portion of the space portion 60 at the side facing the ABS surface, so that the flow of a magnetic flux passing through the upper magnetic pole layer 13 and directed toward the recording gap layer 12 can be smoothly changed in the vicinity of the end portion of the space portion 60 at the side facing the ABS surface 30, that is, in the vicinity of the throat height zero position TH0. As a result, the electromagnetic conversion characteristics of the recording head, for example, the overwrite characteristic or NLTS can be improved.

As described above, according to the present invention, it becomes possible to improve the electromagnetic conversion characteristics by smoothly changing the flow of a magnetic flux in the vicinity of the end face of the stepped portion constituting the step gap structure.

What is claimed is:

1. A thin film magnetic head, comprising:

a lower magnetic pole layer having one magnetic pole at a side facing an ABS surface;

a gap layer formed on at least the one magnetic pole;

a stepped portion of a nonmagnetic material formed on the gap layer and having an almost vertically formed end face at a side facing the ABS surface;

a space portion formed at the end face;

an upper magnetic pole layer including another magnetic pole opposite to the one magnetic pole through the gap layer, formed on at least the gap layer, the space portion, and the stepped portion, and magnetically connected to the lower magnetic pole layer to constitute a closed magnetic path; and a thin film coil provided between the upper and lower magnetic pole layers through an insulating layer.

2. A thin film magnetic head according to claim 1, wherein a throat height is defined by an end portion of the space portion at a side facing the ABS surface.

3. A thin film magnetic head according to claim 1, wherein the end portion of the space portion at the side facing the ABS surface is positioned closer to the ABS surface than an end portion of the another magnetic pole at an opposite side to the ABS surface.

4. A thin film magnetic head according to claim 1, wherein a side of the upper magnetic pole layer facing the space portion includes an inclined surface connecting a surface of the gap layer and the stepped portion.

* * * * *